United States Patent
Webb (10) Patent No.: US 6,512,356 B1
(45) Date of Patent: Jan. 28, 2003

(54) APPARATUS AND METHOD FOR DETERMINING ELECTRICAL POLARIZATION OF DISTRIBUTION OF A VESSEL

(76) Inventor: Geoffrey John Webb, 26 Waterside Court, Gnosall, Stafford ST20 0AR (GB)

( * ) Notice: Subject to any disclaimer, the term of this patent is extended or adjusted under 35 U.S.C. 154(b) by 0 days.

(21) Appl. No.: 09/242,507

(22) PCT Filed: Feb. 16, 1998

(86) PCT No.: PCT/GB98/01750

§ 371 (c)(1),
(2), (4) Date: Dec. 16, 1999

(87) PCT Pub. No.: WO98/58276

PCT Pub. Date: Dec. 23, 1998

(30) Foreign Application Priority Data

Jun. 16, 1997 (GB) .............................. 9712521

(51) Int. Cl.[7] .......................... G01V 3/08; G01N 27/00; G01R 33/02; G01R 19/00
(52) U.S. Cl. ........................ 324/72; 324/260; 324/345; 324/348; 324/350; 324/365; 324/425
(58) Field of Search .......................... 324/72, 348–350, 324/362, 365, 244, 260, 425, 444, 449, 457; 340/852

(56) References Cited

U.S. PATENT DOCUMENTS

| | | | | |
|---|---|---|---|---|
| 3,329,929 A | * | 7/1967 | Burnett | 324/365 X |
| 3,514,693 A | * | 5/1970 | Cagniard | 324/350 |
| 3,641,427 A | | 2/1972 | Pittman et al. | 324/9 |
| 3,946,354 A | | 3/1976 | Keck | 340/4 E |
| 4,210,869 A | * | 7/1980 | Groenendyke et al. | 324/350 X |
| 5,206,640 A | | 4/1993 | Hirvonen et al. | 340/852 |
| 5,327,089 A | * | 7/1994 | Ouellette | 324/365 X |
| 5,770,945 A | * | 6/1998 | Constable | 324/350 |

FOREIGN PATENT DOCUMENTS

| | | |
|---|---|---|
| DE | 40 18 312 | 12/1991 |
| EP | 0 621 493 | 10/1994 |
| JP | 4-11404 | 1/1992 |
| JP | 9-54055 | 2/1997 |

* cited by examiner

Primary Examiner—Gerard R. Strecker
(74) Attorney, Agent, or Firm—Marshall, Gerstein & Borun

(57) ABSTRACT

Apparatus for determining the distribution of the electric polarization of a vessel in water, comprises an array of electric potential sensors (22) which are located in the water beneath the vessel and each generates a signal corresponding to the amplitude of the electric potential at the sensor as effected by the vessel, a signal processor unit (48) and cables (42) connecting each sensor (22) to the signal processor unit (48) to deliver each respective signal to the signal processor unit, the signal processor unit (48) serving to determine the potential difference between respective pairs of sensors (22) from the respective signals they generate, and the signal processor unit (48) processing multiple such potential difference determinations to deduce the distribution of electric polarization in the vessel which would cause said electric potential at each of the electric potential sensors (22). In addition, the electrical field and corrosion related magnetic field can be deduced from the distribution of electric polarization.

12 Claims, 5 Drawing Sheets

APPARATUS AND METHOD FOR DETERMINING ELECTRICAL POLARIZATION OF DISTRIBUTION OF A VESSEL

The present invention in its various aspects relates to measurements of electric field, and measurements of electric potential, underwater from a vessel and calculation of the electric polarisation distribution characterizing that vessel.

BACKGROUND

The function of a magnetic range is to make measurements of the magnetic field from ships and submarines and provide information to set on-board countermeasures to minimize the threat from magnetic mines. A known transportable magnetic range is that sold under the trademark Transmag by Ultra Electronics Magnetic Division. A key part of the Transmag system is its ability to create a computer magnetic model of a ship. In other magnetic ranges, not involving modeling, the user sees magnetic measurements from sensors displayed on a computer screen, chart recorder or the like, and this data is as much affected by the ship passing the sensors at different distances and water depths and other environmental circumstances as it is by various changes which are made to the magnetic state of the ship. Consequently, the interpretation of the data is very difficult. By using a magnetic model in which a ship is considered as a distribution of dipoles, the measured magnetic model in which a ship is considered as a distribution of dipoles, the measured magnetic data is not shown directly but calculated data using the model is displayed. The displayed data is corrected so as to be as if the ship was passing over the exact cense of the range at a predetermined depth. Thus, the only variations in displayed data are due to real changes in the magnetic state of the ship. In consequence, interpretation of the data is made much easier but, more importantly, further processing by computer is possible.

Magnetic modelling has reduced the number of sensors necessary from dozens in some cases to a minimum of three if the ship can be sufficiently accurately navigated, or five to cope with a less competent navigational ability.

The magnetic modelling technique is described in a paper entitled "Magnetisation Modelling Techniques" by Dr. G. J. Webb, The Royal Institution of Navel Architects International Conference Proceedings, 1994, Minewarfare, Vessels and Systems-3. The magnetic modelling technique is briefly summarised by the equation $B=\mu_0 D.m$ where B is the vector magnetic field at a point (this field has three vector components), m is the size of the vector magnetic moment which is the source of the field (three vector components), $\mu_0$ is the magnetic permeability of free space, and D is a matrix which contains the vector distance between the source moment and the field measurement point (a three by three matrix).

Ships and submarines each have an associated electric field; this is commonly called Underwater Electric Potential (UEP) field and is caused by corrosion between different metals in the hull and other underwater artifacts. For example, the propulsor is usually of an alloy, for example, phosphor bronze, whilst the hull is usually of steel. Some mines detect UEP using at least one pair of electric field sensors and detonate if the UEP is sufficiently large.

Whenever an electric field exists in a conducting medium, for example, the sea, there is an electric current. Whenever an electric current exists, there is around it a magnetic field. The corrosion current thus gives rise to a corrosion related magnetic (CRM) field. A problem with the corrosion related magnetic (CRM) field is that it decays more slowly with distance than that component of the magnetic field which is due to on-board magnetic items and degaussing coil currents and is known as the ferromagnetic field.

Figure 1:
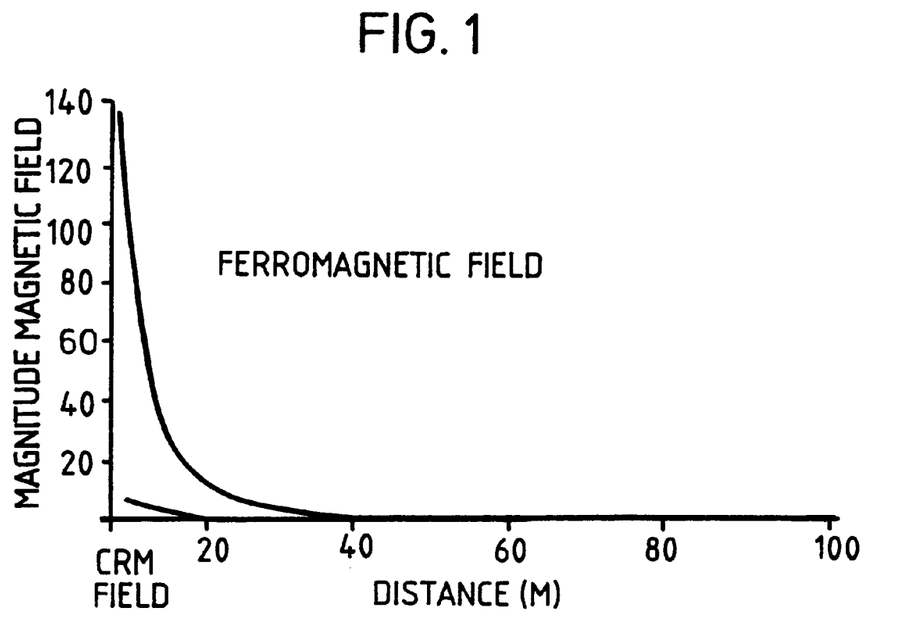
FIG. 1 is a graph showing magnetic field components values against distance from a vessel.
Figure 2:
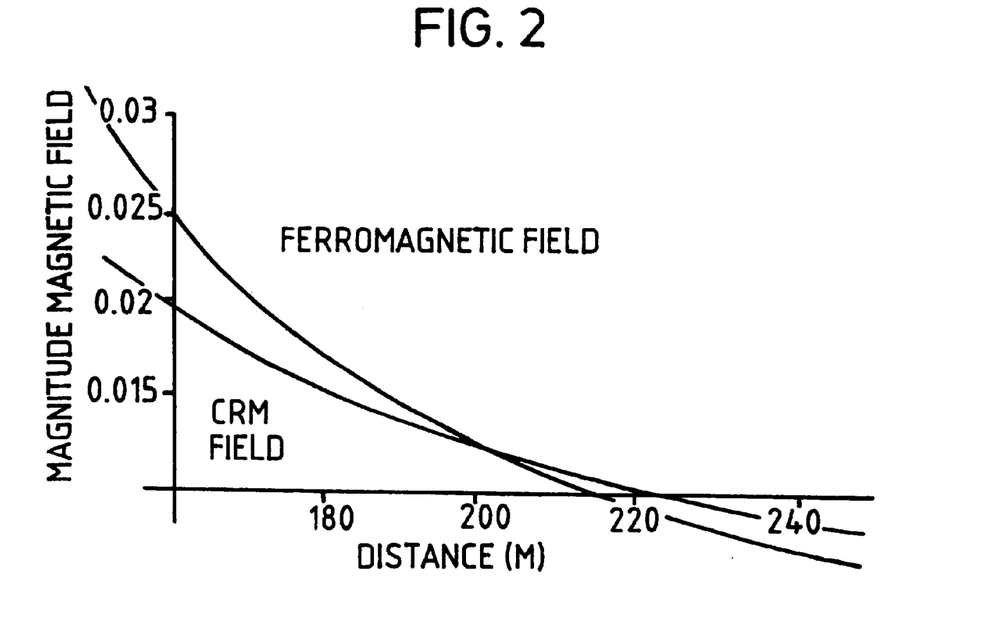
FIG. 2 is a further graph showing magnetic field component values against distance from a vessel.

The degaussing of vessels is undertaken to protect them from magnetic field detecting mines by using on-board countermeasures, in particular degaussing coils, which provide a magnetic field equal and opposite to the vessel's ferromagnetic field. In fact, the ferromagnetic field generally decays as the reciprocal of the cube of the distance whereas the CRM field only decays as the reciprocal of the square of the distance. This is illustrated in FIGS. 1 and 2, which are graphs showing relative magnitude of magnetic field against distance from the vessel in meters. In the both figures, the curve which is higher on the left hand side represents the ferromagnetic field, and the other curve is the CRM field. FIG. 1 shows the two fields from 1 to 100 m from the source. FIG. 2 shows the field at region around 200 m from the source. It is clear that, close to the source, the ferromagnetic field is much larger but, far enough away (in this case 200 m) the CRM field becomes larger.

The CRM field is not always negligible close to the vessel (where magnetic measurements are usually made). For certain types of ship it is possible that the CRM is 10% of the total measured field (CRM plus ferromagnetic field) or more if the ship's degaussing coils are effective.

SUMMARY OF THE INVENTION

In its first aspect, the present invention relates to apparatus for determining an electric polarisation distribution of a vessel including a plurality of electric field sensors which are positioned in use underwater under the vessel, and processor means operative to process electric field measurements to determine the electric polarisation distribution of the vessel. The plurality of sensors are preferably arranged in a row, for example on the sea- or harbour bed. There are preferably between three and eight electric field sensors, and preferably five electric field sensors. The apparatus can be part of an electromagnetic range including a plurality of magnetic field sensors. The electric field sensors and magnetic field sensors are preferably arranged so as to be equidistant and in an alternating series along a row.

A corrosion related magnetic (CRM) field is preferably determined from the electric polarisation deduced for the vessel. Determination of CRM field can be useful in designing a vessel so as to minimise the risk of detection from the magnetic field, in particular CRM field, which it produces.

In its first aspect, the present invention also relates to a corresponding method of polarisation distribution determination from electric field measurements. Preferably corrosion related magnetic field is deduced from the polarisation distribution.

In its second aspect, the present invention also relates to apparatus for determining an electric polarisation distribution of a vessel including a plurality of electrical potential sensors which are positioned in use underwater under the vessel, and processor means operative to process electric field measurements to determine the electric polarization distribution of the vessel. The plurality of sensors are preferably arranged in a row, for example on the sea or harbour bed. There are preferably between three and eight electric potential sensors, and preferably five electric potential sensors. The apparatus can be part of an electromagnetic range including a plurality of magnetic field sensors. The electric potential sensors and magnetic field sensors are preferably arranged along a row such that each magnetic field sensor carries an electric potential sensor.

A corrosion related magnetic field is preferably determined from the electric polarisation distribution deduced for the vessel.

In its second aspect, the present invention also relates to a corresponding method of polarisation distribution determination from electric potential measurements. Preferably corrosion related magnetic field is deduced from the polarisation distribution.

Using electric potential sensors has a number of significant advantages. In particular, there is no requirement to align the electric potential sensors, so they can simply be fixed on top of a magnetic sensor. In a preferred embodiment, potential sensors are inherently less sensitive to positioning than electric field sensors. This is because the electric potential from a dipole source varies as the reciprocal of the distance squared whereas the electric field decays as the reciprocal of the distance cubed. Electric potential sensors are less sensitive to noise than electric field sensors. Electric potential sensors are typically cheaper than electric field sensors.

In its third aspect the present invention relates to apparatus for determination of the electric field of a vessel from its polarisation distribution. The present invention also relates to a corresponding method. This can be useful in designing vessels with low UEP fields, in particular so as to minimise the risk from UEP mines.

In its fourth aspect the present invention relates to apparatus for determination of corrosion related magnetic field from the polarisation distribution. The present invention also relates to a corresponding method.

PREFERRED EMBODIMENTS

Preferred embodiments of the present invention in its various aspects will now be described by way of example and with reference to the figures, in which.

SYSTEM INVOLVING ELECTRIC FIELD SENSING

Figure 3:
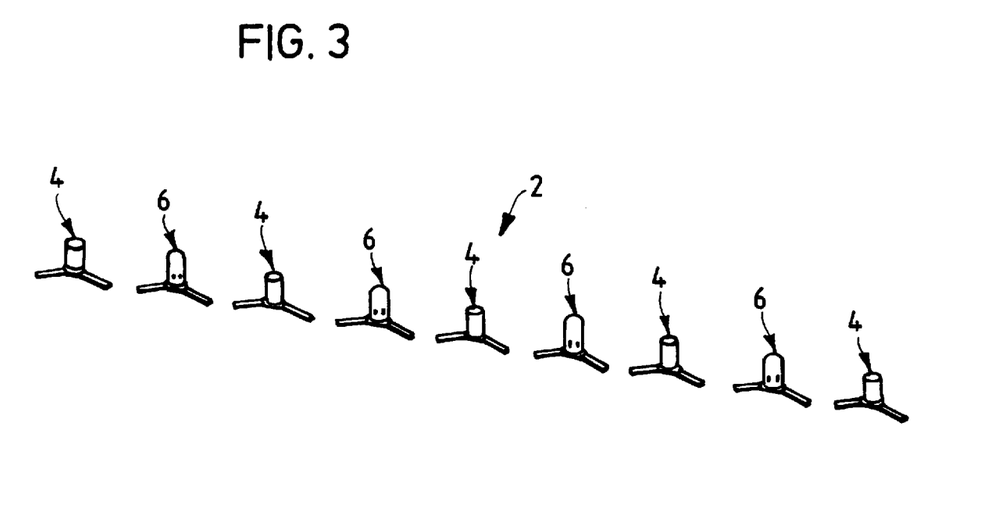
FIG. 3 illustrates a first system including alternate magnetic field and electric field sensors.
Figure 4:
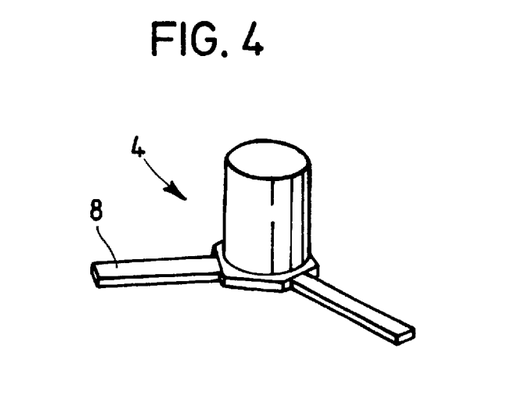
FIG. 4 is a simplified perspective view of one magnetic field sensor (on a tripod mounting)

As shown in FIG. 3, the first ranging system 2 includes alternating magnetic field sensors 4 of known type and electric field sensors 6, positioned, in use, in a row along the sea or harbour bed. The sensors 4, 6 are connected using cables (not shown) to control circuitry (not shown). There are five underwater magnetic sensors 4 each standing on a flat tripod 8, as shown in FIG. 4. In alternative embodiments, the magnetic field sensors 4 stand on concrete mattresses, or some other underwater structure. There are also four electric field sensors 6, an enlarged view of one (typical) electric field sensor 6 being shown in FIG. 5. These electric field sensors 6 are also each mounted on a flat tripod.

The sensors 4, 6 are connected to an underwater junction box (not shown) which is itself cabled directly to an on-shore control unit. In an alternative embodiment, the sensors are connected directly individually to the on-shore control unit.

Figure 5:
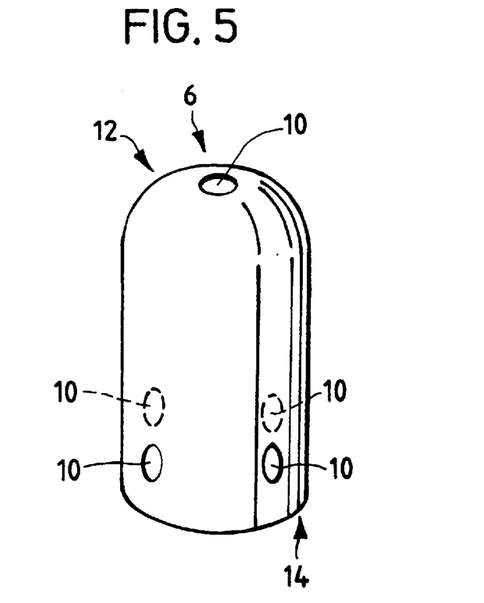
FIG. 5 is a simplified perspective view of one electric field sensor (tripod mounting not shown)

As shown in FIG. 5, each electric field sensor 6 consists of five electrodes 10, one at the top 12 and four around the base 14. Electric field measurements in the three orthogonal axes are taken by determining the potential differences between each of the two opposing sets of base electrodes 10 to give two right-angled horizontal field measurements, and the difference between the potential at the electrode 10 at the top 12 and the sum of the other four electrodes 10 at the base 14 in order to give the vertical electric field component. In addition to the electrodes 10, each electric field sensor 6 includes a three axis magnetometer (not shown) and two inclinometers (not shown) to determine the orientation of the sensor with respect to the Earth's magnetic field.

Sensor Alignment

Each electric field sensor collects its data in a coordinate system defined by the direction in which its axes are pointing. The magnetic field sensors also collect data in a set of three axes except they are gimballed, so we know the vertical axis is vertical. By "gimballed", it is meant that the magnetic sensor hangs like a plumb-bob within a water-tight housing.

The magnetic sensors operate by measuring the Earth's static magnetic field, from which the heading of the two horizontal axes with respect to magnetic north is determined. It is then straightforward to apply a software rotation matrix to collect data in a north, east and down coordinate system.

As there is no Earth's electric field, the same cannot be done with an electric field sensor.

Electric field is a vector so electric field sensors have to be aligned to the Earth's magnetic field. Therefore electric field sensors are rigidly aligned to the magnetic field sensors so the appropriate axes are parallel.

The electric field sensors are not gimballed as they have to be in contact with the sea water and bearings in contact with sea water would soon corrode and cease to work.

The preferred way to get electric field data into Earth's field coordinates is to measure vertically down in the magnetic sensors coordinate system and combine the vector measurement of vertically down in the magnetic sensor's coordinates with the vector measurement Earth's magnetic field in the magnetic sensor's coordinates to determine the magnetic sensor's measurement in Earth's magnetic north coordinates. Each electric field sensor is fixed rigidly to the magnetic field sensors and aligned with it. Thus, the same coordinate transformation from magnetic sensor coordinates to Earth's magnetic field coordinates applies to electric field sensor data.

The two inclinometers mentioned above are used to measure the vector vertically down.

Basis of Operation

It is not possible, close to a test vessel, to distinguish between the ferromagnetic and CRM field by magnetic measurements alone. However, the CRM field is determined directly from measurement of the electric field via a polaristalon distribution model.

Electric field, which has units of volts per meter (V/m), cannot be measured directly. Electric fields in sea water can be measured using the opposing electrode pairs, the pairs being separated by a known distance, typically of the order of tens of centimeters. Thus to determine electric field in the three orthogonal x, y, z directions, the electric field sensor 6 consists of three pairs of electrodes 10. In alternative embodiments, electric field sensors 6 with merely four or five electrodes can be used with appropriate sensor geometry. The four electrodes IO at the base provide the measured x and y components of the field, the z component being obtained from the sum of these four electrodes and the difference with the top electrode.

For accurate measurements each of the pairs of opposing electrodes 10 should be closely spaced compared to the distance from the electromagnetic field source. In consequence, the measured potential differences used to determine electric field components are quite small, but for accuracy must be significantly above the background noise level.

The electric field E is related to polarisation by the following equation:

$$E=(1/\epsilon_o).D.p$$

where E is the field, p is polarisation, $\epsilon_o$ is the permittivity of free space and D is a matrix which contains the vector distance between the electric field source and the electric field measurement point (3 by 3 matrix). Preferably p is a matrix having 144 elements, E has 14043 elements and D has 2022192 elements. By taking sufficient measurements of electrical field, and knowing the geometry, the polarisation distribution is determined.

Corrections for the presence of the sea bed and sea surface are made in determining the polarisation E distribution. In particular, the electric field, E, cannot exist in a conducting medium without a corresponding current density, J, given by J=σE where σ is the conductivity of the medium. The electric dipole equation for the current density field from a source embedded in a conducting medium becomes J=σ/$\epsilon_o$D.p. However, the source moment is in coulomb meter (Cm) and it is conventional to give source strengths in sea water as ampere meter (Am), so the equation becomes J=D.c where c is the current dipole strength.

Further complications follow when the conducting medium is finite and bounded by two other regions of different conductivities, one above and one below, such as the present case of a source embedded in sea water with air above the water and a sea bed below it. The three layers (air, sea and sea bed) have different conductivities. The air conductivity is zero, but the other two are not. The sea bed conductivity is typically an order of magnitude less than the sea conductivity.

The current dipole equation J=D.c is thus enhanced by adding image dipoles. The images are reflected in each interface so that the first in-air image is at a height above the sea surface equal to the depth of the dipole below it and the first sea bed image is at a depth below the sea bed equal to the height of the source dipole above it. Additional images are formed when each of these images reflects and so on. The image moments decrease in accordance with the ratio of the sea bed to sea conductivity and the image distances from the sea layer increase quite rapidly so it is not necessary to sum thousands of images before the summation converges.

An electric field can only exist in sea water if a current density field J exists too, since sea water is a conductor where the current density field J (a vector) follows:

$$J=\sigma E$$

Where σ is conductivity (a scalar) and E is electric field (a vector).

The sea bed and sea surface must be considered. Above the sea surface, the current density is zero since no current flows in air even when there is an electric field. The sea bed has a different conductivity from the sea. Thus we have three different values of current density for the equation above. For the Air region, conductivity $\sigma_O=0$ therefore the current density field $J_O$ is zero. For the Sea region, conductivity $\sigma_1$ is greater than zero therefore the current density field $J_1$ is not zero. For the Sea-bed region, conductivity $\sigma_2$ is greater than zero therefore the current density field $J_2$ is not zero.

Considering the sea surface, since no currents exist in the air, no current passes through the sea surface. This can be approximated as a fictitious dipole above the sea surface producing equal horizontal currents to the fictitious in-sea dipole and equal and opposite vertical currents. From these two dipoles, the total current through the sea surface is zero. We then use the sum of the currents in the sea only from the two dipoles. That sum of currents produces a requirement that there are no currents through the sea surface. $J_0$ are currents from the image, $J_1$ from the source. The currents in air are ignored (as in reality they are zero).

A similar thing happens at the sea bed only this time, because the sea bed has non-zero conductivity (but less than the sea) the dipole moments of the sea bed dipole are reduced in proportion to the ratio of sea-bed to sea conductivity Thus, a pair of notional image dipoles are used in the analysis, one in the air above the source and one in the sea bed below the source.

The air image also has a reflection in the sea bed. And the sea bed image also has a reflection in the air. Furthermore, these images also have images. In fact, there are an infinite number of images. Fortunately, each successive pair of images gets further away and since the field from a dipole decreases as the reciprocal of distance cubed, fairly rapidly the images get less significant. In practice, around 50 images are used, getting to within 1% or so of the infinite sum.

Predicting CRM and Electric Fields

Knowing the polarisation and ideal ship positioning, it is possible to calculate the CRM field $B_{CRM}$ directly from the polarisation using the equation:

$$B_{CRM} = \mu_0 1/4\pi r^3 \begin{pmatrix} 0 & z & -y \\ -z & 0 & x \\ y & -x & 0 \end{pmatrix} \underline{p}$$

where $\mu_0$ is the magnetic permeability of free space, r is separation from the vessel, p is polarisation and x, y, z are distances of each dipole position in the vessel from each predicted point in the predicted data. $B_{CRM}$ is a matrix having 3×31×151=14043 elements. The polarisation distribution p is a matrix of 144 elements corresponding to the notional 48 dipoles x three axes. The three by three matrix above is thus repeated, with different x, y, z values, 48×4681=224688 times.

As magnetic field $B_m$ is measured using the magnetic field sensors, the ferromagnetic field $B_F$ can be calculated from $B_m$ and $B_{CRM}$ as follows:

$$B_F=B_m-B_{CRM}$$

From this $B_F$ a magnetic moment distribution m is calculated. From this magnetic moment distribution m, the ferromagnetic field at specific positions $B_{FP}$ is predicted, if desired.

Calculating $B_{FP}$ magnetic field distribution is useful as this enables the ampere-turn setting of the degaussing coils which compensate to be set appropriately in the vessel. Furthermore, being aware of the $B_{FP}$ and $B_{CRM}$ distributions enables vessel's magnetic fields to be reduced so as to reduce a threat posed by magnetic field sensitive mines, and long range detection devices where the corrosion related magnetic CRM component $B_{CRM}$ of the magnetic field is relatively more significant.

Also electrical field can be predicted at other positions from the polarisation distribution p using the equation $E=(1/\epsilon_0).D.p$. E is a measure of the Underwater Electric Potential (UEP) field from the vessel.

$B_{CRM}$ is preferably a matrix consisting of 14043 elements, p being a matrix with 144 elements.

System Involving Electrical Potential Measurement

Figure 6:
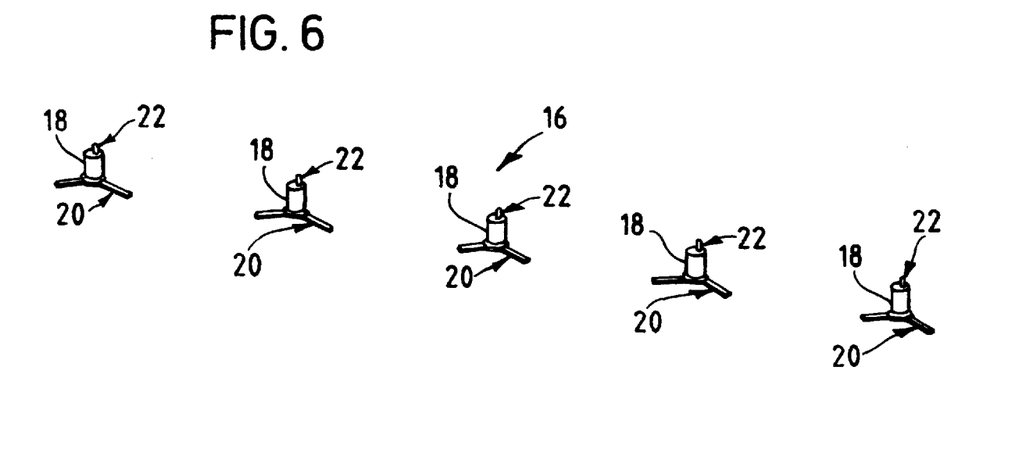
FIG. 6 illustrates a second system including magnetic field sensors and electric potential sensors.
Figure 7:
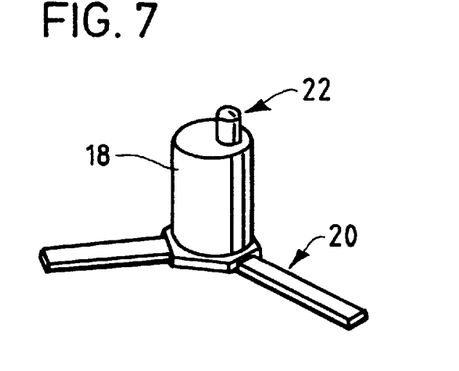
FIG. 7 is a simplified perspective view of one combined magnetic field electric potential sensor of the second system.

A second system 16, shown in FIG. 6, consists of five magnetic field sensors 18 each mounted on a flat tripod, shown in FIG. 7. An electric potential sensor 22 is mounted on top of each magnetic field sensor 18. The connecting cables and control circuitry are not shown in FIG. 6.

Each electric potential sensor 22 has no alignment requirement so is simple fixed at the top of a magnetic sensor 18.

Figure 8:
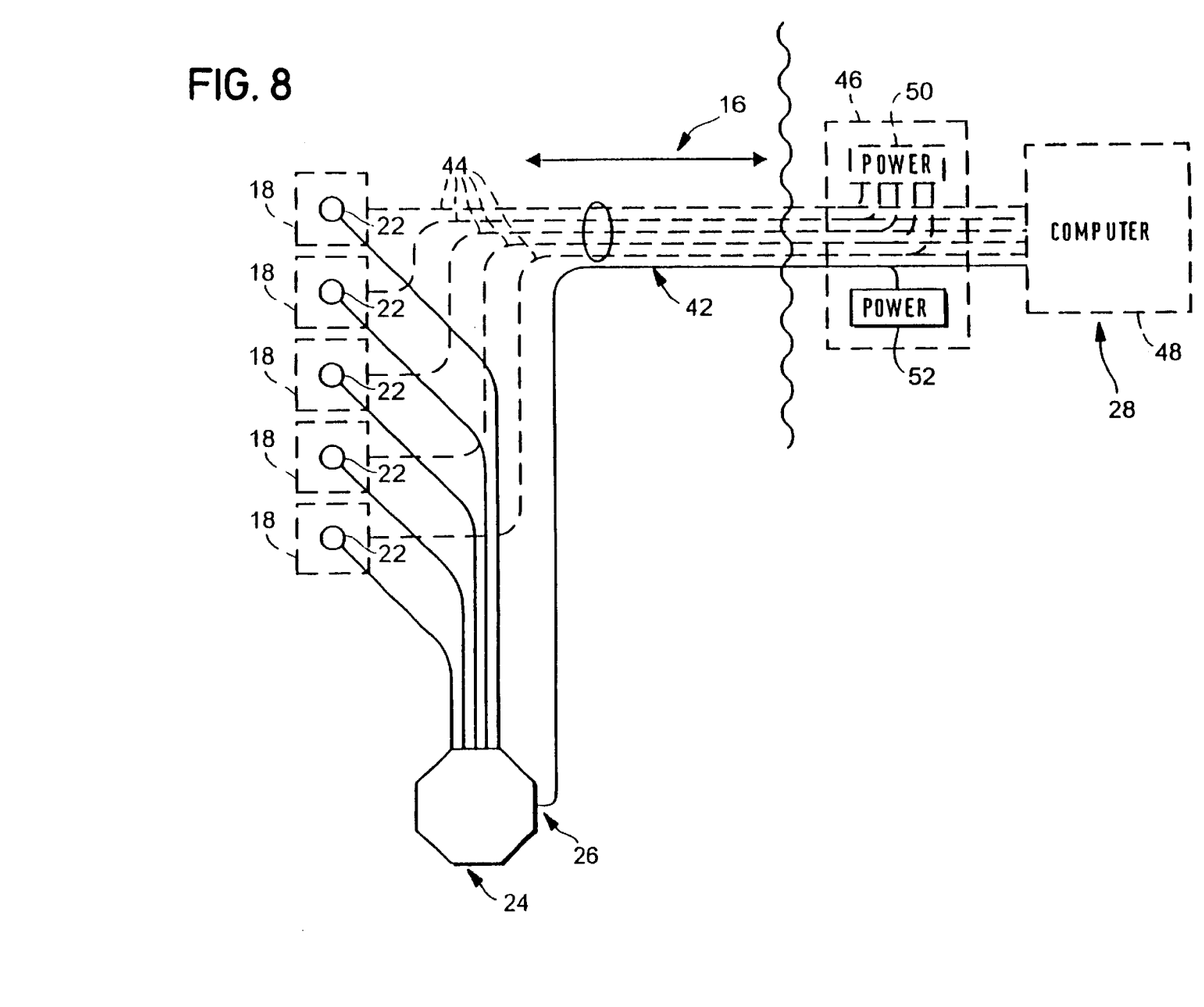
FIG. 8 illustrates the second system in more detail.

Because electric potential (from a dipole source) varies as the reciprocal of distance squared, whereas the electric field decays as the reciprocal of the distance cubed, potential sensors 22 are less sensitive to positioning errors then the electric field sensors 6 of the first system 2. It is also considered that potential sensors 22 may be inherently less sensitive to local electric field anomalies, such as due to different metals in underwater connectors and fittings, than electric field sensors 2. As shown in FIG. 8, the second system 16 consists of five magnetic field sensors 18 on each of which is mounted a corresponding electric potential sensor 22. The electric potential sensors 22 are each connected to an underwater junction box 24. The junction box is connected via an output port 26 to on-shore circuitry 28.

Figure 9:
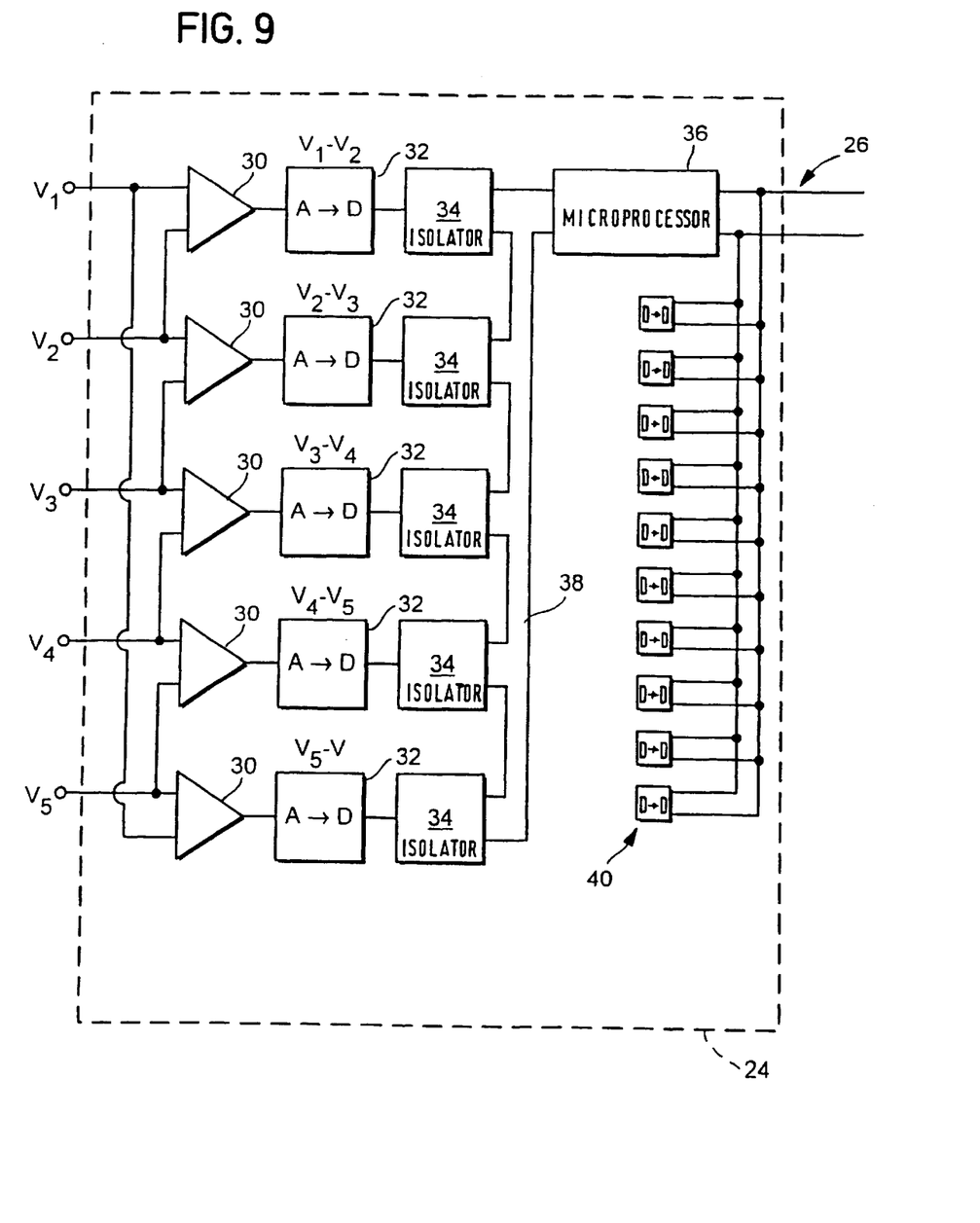
FIG. 9 shows the electronics in the underwater junction box of the second system.

As shown in FIG. 9, the underwater junction box 24 has five input ports, denoted $V_1$ to $V_5$ for receiving respective output signals from the five electric potential sensors 18. As shown in FIG. 9 the signal from each potential sensor 18 and the next one or the signal from the first and last sensors in the series are input into respective low noise differential amplifiers 30. Each differential amplifier 30 is connected via an A to D convertor 32 and opto-isolator 34 to a microprocessor 36 within the underwater junction box 24. The micro-processor 36 and opto-isolators 34 are connected via a bus 38. Power is provided to the amplifiers 30, A to D convertors 32 and opto-isolators 34 via DC to DC convertors 40. The connections of the DC to DC convertors 40 to the other circuit elements 30, 32, 34 are not shown for reasons of clarity. The output port 26 from the underwater junction box 24 is to a serial data link to the on-shore circuitry 28. The data link is part of a cable 42 along which power is also passed.

Returning to FIG. 8, the cable 42 can be several kilometers long and lies with other cables 44 connected to the magnetic field sensors 18. The on-shore control circuitry 28 includes a cubicle 46 and computer 48. The cubicle 46 includes a power supply 50 to the magnetic field sensors 18 and a power supply 52 to the electric potential sensors 18 and underwater junction box 24.

In the junction box 24, opto-isolation is essential to avoid earth currents through the on-shore control circuitry. Power is thus supplied via DC to DC convertors 40.

This preferred embodiment of the second system is shown with five magnetic field sensors and five electric potential sensors. In other embodiments between three and eight pairs inclusive of magnetic field sensors and electric potential sensors are selected.

Basis of Operation

The electric field from a dipole is defined as:

$$E=(1/\epsilon_0).D.p$$

where $\epsilon_0$ is the permittivity of free space, p is polarisation, and D is a matrix which contains the vector distance between the source and the field measurement point. Preferably p is a matrix having 144 elements, E has 14043 elements and D has 2022192 elements.

Now $E=-\nabla V$ where $\nabla$ is the mathematical notation meaning gradient of, and V is electric potential.

In order to relate potential V directly to polarisation we defined a row vector Q such that;

$$V=Q.p$$

Taking the gradient of both sides gives the electric dipole equation $$\nabla V=-E=(-1/\epsilon_0).D.p=\nabla Q.p$$

Hence the polarisation distribution is determined from potential measurements as described below.

Of course, the potential at a point is not uniquely defined. In particular, the electric potential at a point in the sea will depend, to some extent, on the corrosion fields of other vessels in the sea, on electric fields due to cosmic rays hitting the sea, and many other influences. What can be defined is the potential difference. This is measured as the difference in potential between two electrodes. This is not a determination of electric field.

For electric potential difference measurements, the potential differences between the appropriate pairs of electric potential sensors 22 are determined. In particular, for the first two sensors 18 denoted a and b we have: $V_a=Q_a.p$ and $V_b=Q_b.p$. Subtracting these gives:

$$(V_a-V_b)=(Q_a=Q_b).p$$

Preferably $V_a$ and $V_b$ are matrices each having 480 elements, p is a polarisation distribution matrix having 144 elements, and $Q_a$ and $Q_b$ are matrices each of 69120 elements. The inverse of this equation is solved in the computer 48 and the polarisation distribution of the vessel determined. This involves electric potential measurements from all five electric potential sensors 22 in the preferred system.

It would be seen that from measurement of potential, the polarisation distribution is deduced. It is then possible to predict both electric field, and CRM field magnitude at any selected position from the polarisation, as described in the previous section entitled "Predicting CRM and Electric Fields". The values calculated via this route have been found to be accurate with directly measured electric fields and CRM fields to within a few percent.

Potential sensors are typically separated by approximately 6 meters (depending on sea depth), and are less sensitive to noise than the electric field sensors 6 of the first system 2. In particular, with a range 2 of sensors at approximately 9 meters depth and potential sensors 22 at approximately 6 meters apart, and with amplifier and electrode noise of 50 nano-volts, the electric field noise is approximately 6 nano-volts per meter. This compares to a noise level of 200 nano-volts per meter for a corresponding range 2 having electric field sensors 6 of say 0.25 meters apart and with the same amplifier and electrode noise of 50 nano-volts.

What is claimed is:

1. Apparatus for determining the distribution of the electric polarisation of a vessel in water, comprising:

an array of electric potential sensors which are located in the water beneath the vessel, each sensor being adapted to generate a signal corresponding to the amplitude of the electric potential at the sensor as effected by the vessel;

a signal processor unit communicatively coupled to each sensor, the signal processor unit serving to determine potential differences between respective pairs of sensors based on the respective signals generated by the sensors, and to deduce a distribution of electric polarisation in the vessel based on the determined potential differences.

2. Apparatus as claimed in claim 1, in which a plurality of the sensors are arranged in a row on the sea or harbour bed.

3. Apparatus as claimed in claim 2, comprising between three and eight sensors.

4. Apparatus as claimed in claim 3, comprising five sensors.

5. Apparatus as claimed in claim 1, including a plurality of magnetic field sensors to determine the magnetic distribution of the vessel underwater.

6. Apparatus as claimed in claim 1, in which the electric potential sensors and a plurality of magnetic field sensors are arranged along a row on the sea or harbour bed such that each magnetic field sensor carries an electric potential sensor, the magnetic field sensors being used to determine the magnetic distribution of the vessel underwater.

7. Apparatus as claimed in claim 1, which determines the corrosion related magnetic field of the vessel from the electric polarisation.

8. A method of determining the distribution of the electric polarisation of a vessel in water, comprising the steps of:

proving an array of electric potential sensors in the water beneath the vessel, each sensor being adapted to generate a signal corresponding to the amplitude of the electric potential at the sensor as effected by the vessel;

determining the potential difference between respective pairs of sensors based on the respective signals generated by the sensors; and deducing the distribution of electric polarisation in the vessel based on the determined potential differences.

9. A method as claimed in claim 8, in which the corrosion related magnetic field of the vessel is deduced from the polarisation distribution.

10. A method for determining the electric field of a vessel which comprises determining the electric polarisation distribution of the vessel according to claim 9, and subsequently determining the electric field of the vessel from said determination of the electric polarisation distribution of the vessel.

11. A method of determining the corrosion related magnetic field of a vessel in water comprising:

providing an array of electric potential sensors in the water beneath the vessel, each sensor being adapted to generate a signal corresponding to the amplitude of the electric potential at the sensor as effected by the vessel;

determining the potential difference between respective pairs of sensors based on the respective signals generated by the sensors;

deducing the distribution of electric polarisation in the vessel based on the potential difference determinations; and deducing the corrosion related magnetic field from the deduced electric polarisation distribution.

12. A method of determining the electric field of a vessel in water comprising:

providing an array of electric potential sensors in the water beneath the vessel each sensor being adapted to generate a signal corresponding to the amplitude of the electric potential at the sensor as effected by the vessel;

determining the potential difference between respective pairs of sensors based on the respective signals generated by the sensors;

deducing the distribution of electric polarisation in the vessel based on the potential difference determinations; and deducing the electric field from the deduced electric polarisation distribution.

* * * * *